United States Patent
Fukui et al.

(10) Patent No.: US 6,433,462 B2
(45) Date of Patent: Aug. 13, 2002

(54) ULTRASONIC MOTOR AND METHOD FOR MANUFACTURING THE SAME

(75) Inventors: Takashi Fukui, Aichi-ken; Kouichi Ikeda, Okazaki, both of (JP)

(73) Assignee: ASMO Co., Ltd. (JP)

( * ) Notice: Subject to any disclaimer, the term of this patent is extended or adjusted under 35 U.S.C. 154(b) by 0 days.

(21) Appl. No.: 09/776,358

(22) Filed: Feb. 2, 2001

(30) Foreign Application Priority Data

Feb. 4, 2000 (JP) ........................................ 2000-028202

(51) Int. Cl.⁷ ................................................. H02N 2/00
(52) U.S. Cl. ............. 310/323.04; 310/312; 310/323.08; 310/323.11
(58) Field of Search .......................... 310/323.04, 312, 310/323.08, 323.11

(56) References Cited

U.S. PATENT DOCUMENTS 4,752,711 A * 6/1988 Tsukimoto et al. .... 310/323.08
4,959,580 A * 9/1990 Vishnevsky et al. ... 310/323.08
5,013,956 A * 5/1991 Kurozumi et al. ..... 310/323.08
5,402,030 A * 3/1995 Mukohjima ........... 310/323.08

FOREIGN PATENT DOCUMENTS

| JP | 07-135788 | * 5/1995 | ............ 310/323.08 |
| JP | 07-250488 | 9/1995 | ............ H02N/2/00 |
| JP | 2000-184758 | * 6/2000 | ............ 310/323.06 |

* cited by examiner

*Primary Examiner*—Thomas M. Dougherty
(74) *Attorney, Agent, or Firm*—Cook, Alex, McFarron, Manzo, Cummings & Mehler, Ltd.

(57) ABSTRACT

An ultrasonic motor includes a stator, which includes a piezoelectric element, and a rotor, which opposes the stator. The piezoelectric element vibrates the stator to rotate the rotor. The rotor has an annular thin section. An elastic ring is secured to the thin section. The mass of the elastic ring is selected from a predetermined range of masses. The motor speed at which a predetermined level of noise is produced by the motor is substantially constant for the range of the masses. This reliably damps undesirable vibration of the motor.

21 Claims, 3 Drawing Sheets

ULTRASONIC MOTOR AND METHOD FOR MANUFACTURING THE SAME

BACKGROUND OF THE INVENTION

The present invention relates to ultrasonic motors and methods for manufacturing ultrasonic motors, and, more particularly, to structures for damping undesirable vibration of ultrasonic motors.

A typical ultrasonic motor has a stator and a rotor. The stator includes an annular vibrating portion at the outer periphery of the stator. An annular piezoelectric element is secured to the vibrating portion. A pressing member presses the rotor against the stator. A rotary shaft is connected to the rotor and rotates integrally with the rotor. When provided with high frequency voltage, the piezoelectric element vibrates to produce progressive waves in the vibrating portion of the stator. This rotates the rotor integrally with the rotary shaft.

Generally, an external device is connected to the rotary shaft of the motor and applies load to the motor. The load acting on the motor rapidly changes if the motor is started or stopped. This produces a sudden vibration between the external device and the rotary shaft or between the rotary shaft and the rotor. The vibration is transmitted to the vibrating portion of the stator through the rotor and affects the progressive waves in the vibrating portion. This leads to various problems such as unstable rotation of the motor, reduced motor power, and noise.

Japanese Unexamined Patent Publication No. 7-250488 describes an ultrasonic motor that solves these problems. More specifically, the ultrasonic motor includes an annular groove formed along an outer periphery of a rotor. The groove opens radially inward, and an elastic, rubber ring is fitted in the groove. The ring damps undesirable vibration otherwise transmitted from the rotor to a stator, thus optimizing the rotation of the motor.

However, although the aforementioned publication includes the elastic ring in the rotor, it does not specify a detailed structure of the ring. Thus, to reliably damp undesirable vibration, it is necessary to specify the structure of the elastic ring.

SUMMARY OF THE INVENTION

Accordingly, it is an objective of the present invention to provide an ultrasonic motor that reliably damps undesirable vibration and a method for manufacturing the ultrasonic motor.

To achieve the foregoing and other objectives and in accordance with the purpose of the present invention, the invention provides an ultrasonic motor comprising a stator, which includes a piezoelectric element, a rotor, which is opposed to the stator, wherein the piezoelectric element vibrates the stator to rotate the rotor, and an elastic member secured to the rotor, wherein the mass of the elastic member is within a predetermined range of masses, and the motor speed at which a predetermined level of noise is produced by the motor is substantially constant for the masses in the predetermined range.

The invention also provides an ultrasonic motor comprising a stator, which includes a piezoelectric element, a rotor, which is opposed to the stator, wherein the rotor includes an annular contact portion that contacts the stator and an annular thin section, which is located radially inward with respect to the contact portion, the thin section being thinner in the axial direction than the remainder of the rotor, wherein the piezoelectric element vibrates the stator to rotate the rotor, and an annular elastic member, which is secured to the thin section, the specific gravity of the elastic member being equal to or smaller than 1.45, and the thickness of the elastic member in the axial direction being 1.25 or more times as large as the thickness, as measured in the axial direction, of the thin section.

The invention further provides a method for manufacturing an ultrasonic motor comprising providing a stator having a piezoelectric element, placing a rotor in opposition to the stator such that the piezoelectric element vibrates the stator to rotate the rotor, securing an elastic member to the rotor, and selecting a mass of the elastic member from a predetermined range of masses, wherein the motor speed at which a predetermined level of noise is produced by the motor is substantially constant for the masses in the predetermined range.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
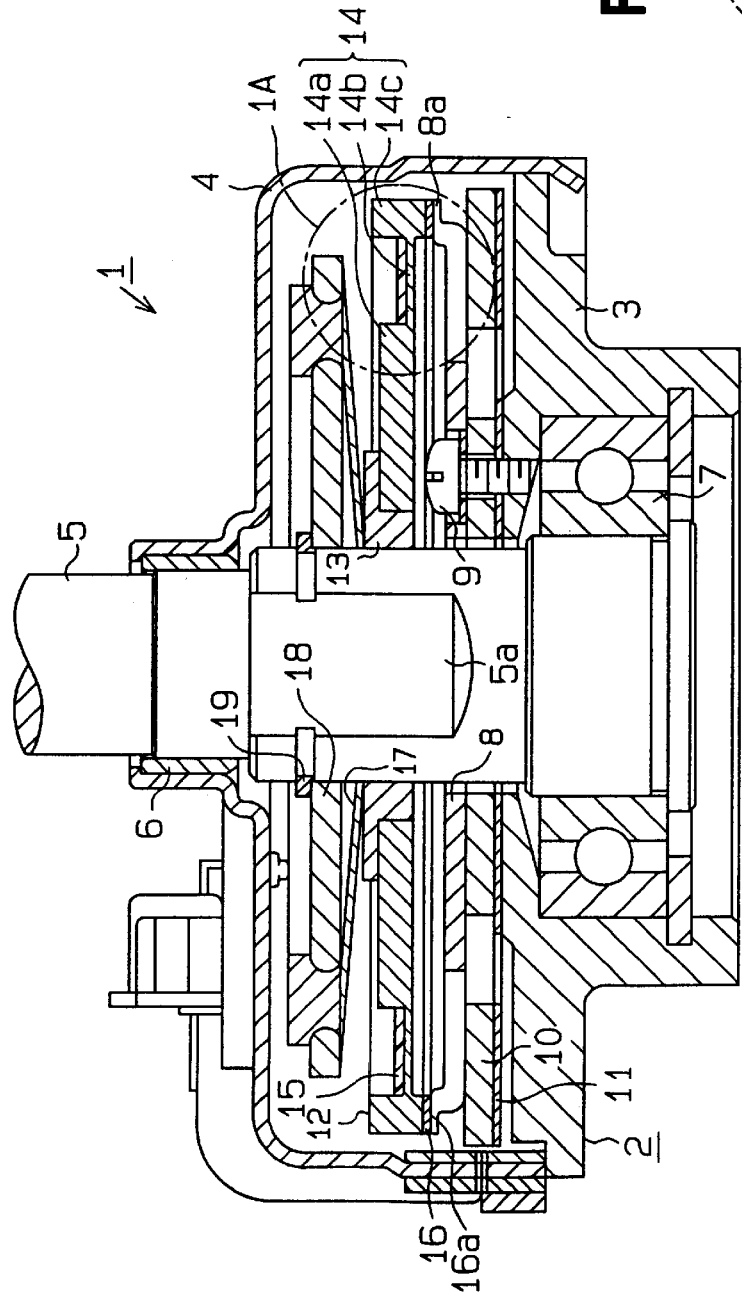
FIG. 1 is a cross-sectional view showing an ultrasonic motor of a first embodiment according to the present invention.

A first embodiment of the present invention will now be described with reference to FIGS. 1 to 3. As shown in FIG. 1, an ultrasonic motor 1 includes a housing 2 having a base 3 and a cover 4, which is secured to the base 3. A radial ball bearing 7 is installed in the base 3, and a sleeve bearing 6 is installed in the cover 4. A rotary shaft 5 is supported by the housing 2 through the bearings 6, 7.

A disk-like stator 8 is secured to the base 3 by a bolt 9 in the housing 2. The rotary shaft 5 extends through the stator 8. The stator 8 includes an annular vibrating portion 8a extending along an outer periphery of the stator 8. An annular piezoelectric element 11 is secured to a lower side of the vibrating portion 8a through a base ring 10, as viewed in FIG. 1.

A disk-like rotor 12 is provided on an upper side of the stator 8. The rotor 12 includes a resin collar 13 and a main body 14. The rotary shaft 5 extends through the collar 13. The main body 14 is located around the collar 13. A pair of parallel, flat sides 5a are formed in an axial intermediate section of the rotary shaft 5. The collar 13 engages with the sides 5a and moves axially with respect to the rotary shaft 5 and does not rotate relative to the rotary shaft 5. The main body 14 is fitted around the resin collar 13 and does not move relative to the collar 13. The rotor 12 is thus supported by the rotary shaft 5 and moves axially with respect to the rotary shaft 5 while rotating integrally with the rotary shaft 5.

Figure 2:
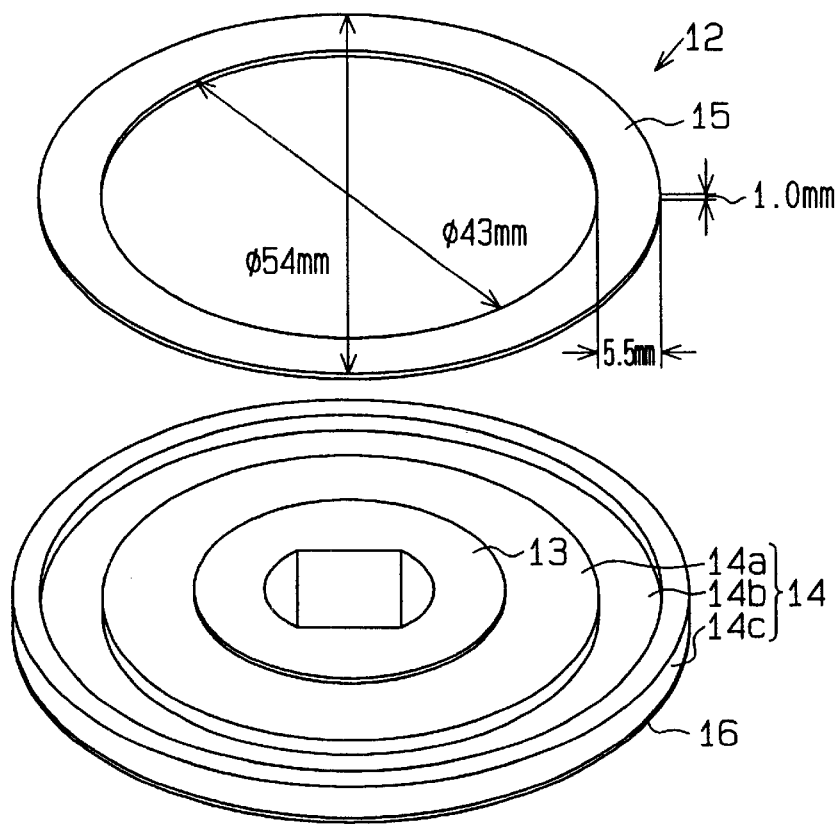
FIG. 2 is an exploded perspective view showing a rotor provided in the motor of FIG. 1.

As shown in FIGS. 1 and 2, the main body 14 includes an annular inner section 14a, an annular thin section 14b, and an annular outer section 14c. The inner section 14a is located radially inward, the thin section 14b is located radially intermediate, and the outer section 14c is located radially outward. The main body 14 has an annular groove opening upward, as viewed in FIG. 1, at a radial position corresponding to the thin section 14b.

An elastic ring 15 is fitted in the annular groove and is secured to the thin section 14b. The radial dimension of the ring 15 is equal to that of the groove. Accordingly, when securing the elastic ring 15 to the main body 14, the ring 15 is positioned accurately with respect to the main body 14. That is, the elastic ring 15 is easily and accurately installed at the appropriate location on the main body 14.

It is preferred that the elastic ring 15 is formed of elastic resin or rubber. In the first embodiment, the ring 15 is formed of silicone rubber, or, preferably, silicone rubber having an improved vibration damping performance. More specifically, the material forming the ring 15 has a loss factor of 0.45, which is relatively high. The loss factor is determined by multiplying an index k by a damping coefficient. The index k is a predetermined constant. Further, the specific gravity of the material forming the ring 15 is 1.45.

The elastic ring 15 extends along the entire circumference of the rotor 12, thus reliably damping undesirable vibration of the rotor 12. Further, the radial cross-sectional shape of the ring 15 is flat and rectangular and is uniform along the entire circumference of the rotor 12. This structure stabilizes the rotation of the rotor 12.

As shown in FIG. 1, a lining 16 is secured to a lower side of the outer section 14c of the main body 14. The outer section 14c opposes the vibrating portion 8a of the stator 8, and the lining 16 is located between the outer section 14c and the vibrating portion 8a. A lower side of the lining 16 includes a contact surface 16a that contacts the vibrating portion 8a. The outer section 14c and the lining 16 form a contact portion that contacts the vibrating portion 8a.

A pressing member presses the rotor 12 against the stator 8. The pressing member includes a belleville spring 17 and a support plate 18. The rotary shaft 5 extends through the support plate 18 and the belleville spring 17. The support plate 18 engages the flat sides 5a of the rotary shaft 5. The support plate 18 thus moves axially with respect to the rotary shaft 5 and does not rotate relative to the rotary shaft 5.

The belleville spring 17 is located between the rotor 12 and the support plate 18 and is axially deformed by the rotor 12 and the plate 18. A snap ring 19 is secured to the rotary shaft 5. When the support plate 18 engages with the snap ring 19, the plate 18 cannot move further upward. When deformed, the belleville spring 17 presses the rotor 12 against the stator 8.

When provided with high frequency voltage, the piezoelectric element 11 vibrates. The vibration of the piezoelectric element 11 is transmitted to the vibrating portion 8a of the stator 8 through the base ring 10, thus vibrating the vibrating portion 8a. In this state, the vibrating portion 8a produces progressive waves, which rotate the rotor 12 integrally with the rotary shaft 5.

When an ultrasonic motor is running normally, the motor generates a normal, low sound, the frequency of which is substantially 1 kHz. However, when the motor speed exceeds a certain level, abnormal vibrations and accompanying noise are generated. The abnormal noise is a relatively loud and it has frequency of approximately 5 kHz or higher. When the motor speed exceeds the certain level, the sound generated by the motor suddenly changes. Therefore, generation of the abnormal noise is easily detected.

Figure 3:
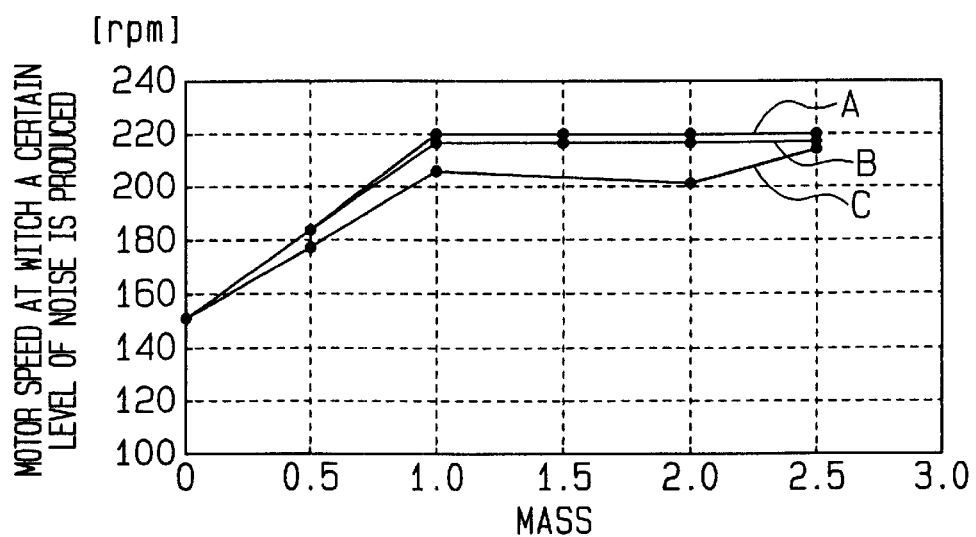
FIG. 3 is a graph representing the relationship between mass of an elastic member and a motor speed at which noise starts.

FIG. 3 is a graph showing the relationship between the mass of the elastic ring 15 and a motor speed at which a certain undesirable level of noise is produced, or a noise producing speed. In the graph, a value indicating the mass of the elastic ring 15 as plotted along the horizontal axis is not a definite value that can be represented with a unit of mass, but is a relative value. In other words, the values on the horizontal axis do not indicate the actual mass of the elastic ring 15 in units of mass.

Three different elastic rings 15 have been tested in the ultrasonic motor 1 of FIG. 1. The graph of FIG. 3 indicates the results of the tests. The tests have been conducted under the same conditions, except that the materials of the elastic rings 15 were different. More specifically, the elastic rings 15 included sample A, sample B, and sample C. Sample A was made of silicone rubber, which is used in the motor 1 of the first embodiment, the loss factor of which is 0.45. Sample B was ethylene propylene diene monomer (EPDM) with a loss factor of 0.58. Sample C was silicone rubber with a loss factor of 0.075.

In terms of all samples A to C, the motor speed at which a certain undesirable level of noise is produced (noise producing speed) gradually increased as the mass of the elastic ring 15 increased. However, if the mass of the ring 15 exceeded a predetermined value, the noise producing speed remained substantially constant regardless of the mass of the ring 15. In the graph of FIG. 3, the minimum mass at which noise producing speed remains substantially constant is defined as 1.0.

More specifically, if the value representing the mass of sample A was increased from zero to 1.0, for example, the noise producing speed increased from 150 rpm to 220 rpm. However, if the value representing the mass of sample A exceeded 1.0, the noise producing speed remained constant at 220 rpm, regardless of the mass of sample A.

If the value representing the mass of sample A was smaller than 1.0, or if the elastic ring 15 was relatively light, the ring 15 has limited vibration damping performance. That is, the ring 15 does not sufficiently damp undesirable vibration transmitted from the rotor 12 to the stator 8 when the mass of the ring 15 is low. A ring 15 that has a low mass lowers the noise producing speed. However, if the value representing mass is equal to or greater than 1.0, the vibration damping performance of the elastic ring 15 is improved. In other words, the ring 15 sufficiently damps undesirable vibration transmitted from the rotor 12 to the stator 8 when the mass of the ring 15 is relatively high. A ring 15 that has a relatively high mass raises the noise producing speed of the motor 1.

Accordingly, to sufficiently damp undesirable vibration transmitted from the rotor 12 to the stator 8, the mass of the elastic ring 15 must be selected from the range in FIG. 3 in which the noise producing speed remains substantially constant. This stabilizes the rotation of the motor 1, thus increasing the motor power and suppressing noise.

In the first embodiment, the mass of the elastic ring 15 is selected to correspond to the value 1.0 of the graph shown in FIG. 3. In other words, the mass of the ring 15 is the minimum value in the range in which the noise producing speed remains substantially constant. The weight of the rotor 12 is thus relatively small. This minimizes moment of inertia of the rotor 12 to improve the responsiveness and output characteristics of the motor 1.

Figure 1A:
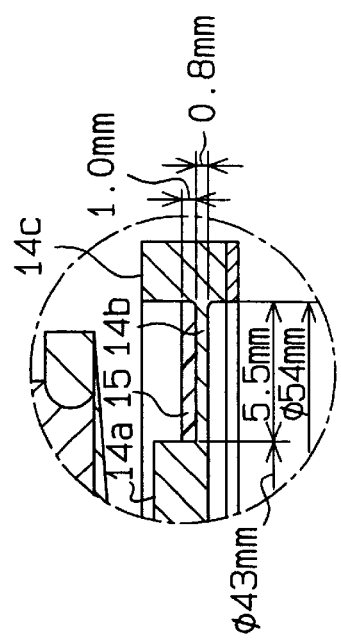
FIG. 1A is an enlarged partial cross-sectional view showing an area indicated by circle 1A in FIG. 1.

More specifically, as shown in FIGS. 1A and 2, the outer diameter of the elastic ring 15 is 54 mm, and the inner diameter of the ring 15 is 43 mm. The radial dimension of the ring 15 is 5.5 mm, and the axial dimension of the ring 15 is 1.0 mm. Further, the axial dimension of the thin section 14*b*, to which the ring 15 is secured, is 0.8 mm. That is, the axial dimension of the elastic ring 15 is 1.25 times as large as that of the thin section 14*b*. The thin section 14*b* easily deforms and damps undesirable vibration, thus improving the vibration damping performance.

The first embodiment of the present invention may be modified as follows.

Figure 4:
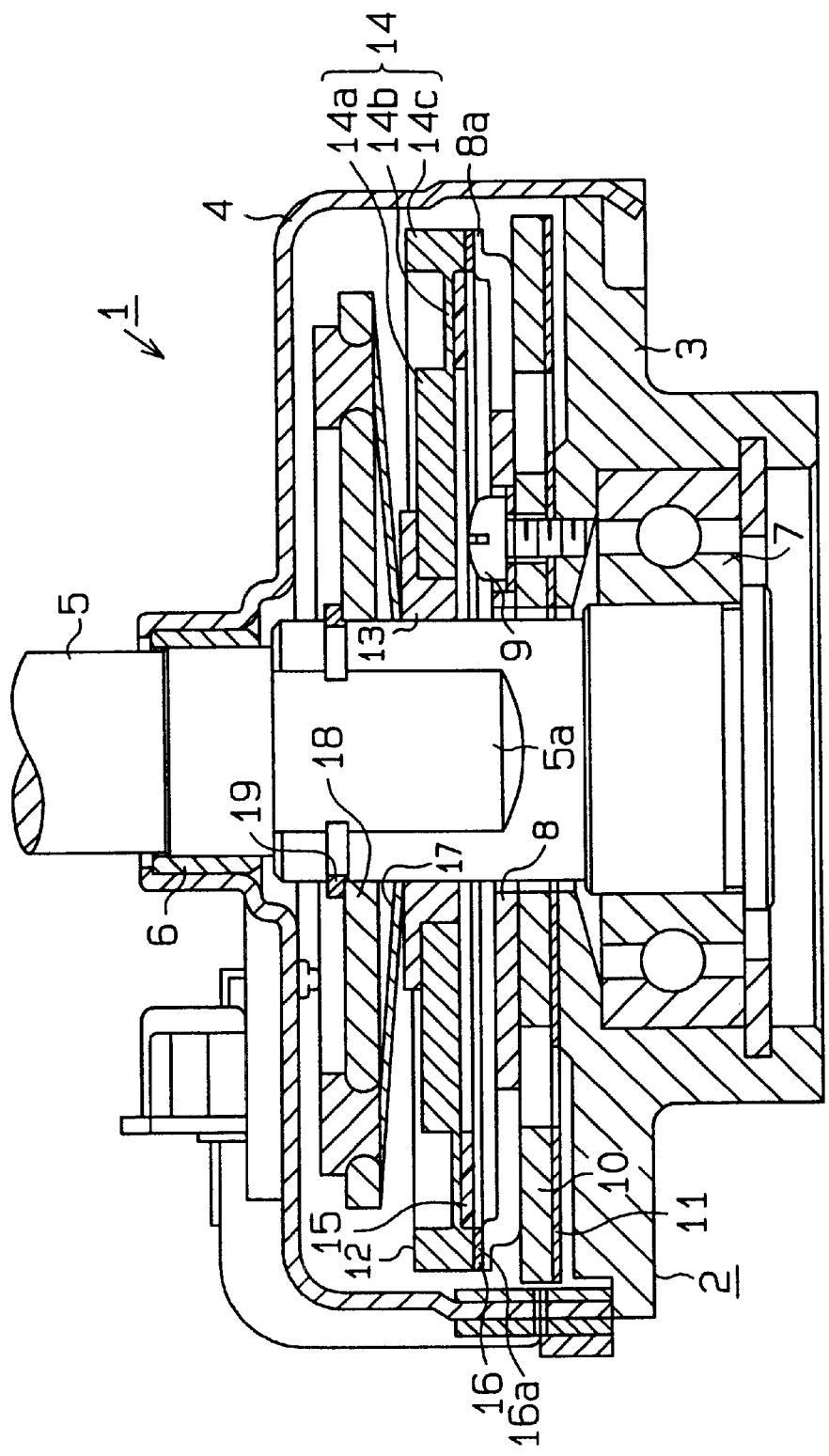
FIG. 4 is a cross-sectional view showing an ultrasonic motor of a second embodiment according to the present invention.

The shape and material of the elastic ring 15 are not restricted to those of the illustrated embodiment. Further, the ring 15 may be located with respect to the rotor 12 at a position different from the illustrated location. For example, as shown in FIG. 4, the elastic ring 15 may be secured to a lower side of the thin section 14*b*, which is the side of the thin section 14*b* that faces the stator 8. In this case, the elastic ring 15 is located relatively close to the contact surface 16*a* of the lining 16. This improves the vibration damping performance of the elastic ring 15. Alternatively, a pair of elastic rings 15 may be secured to opposite sides of thin section 14*b*, respectively. Also, one or more elastic rings 15 may be secured to portions of the rotor 12 other than the thin section 14*b*. In addition, the elastic ring 15 may be divided into separate segments.

The elastic ring 15 does not necessarily have to be formed of the material of sample A of FIG. 3 but may be formed of any other material, as long as the material has good vibration damping characteristics. For example, the elastic ring 15 may be formed of the material of sample B or sample C shown in the graph of FIG. 3. However, it is preferred that the elastic ring 15 is formed of a material having a loss factor equal to or greater than 0.075, which is the loss factor of sample C.

As long as the axial dimension of the elastic ring 15 is substantially 1.25 times as large as that of the thin section 14*b*, the axial dimension of the ring 15 and that of the thin section 14*b* may be altered as needed. If the axial dimension of the thin section 14*b* is increased, vibration is easily transmitted through the thin section 14*b*. Thus, as the axial dimension of the thin section 14*b* is increased, the axial dimension of the elastic ring 15 must be increased accordingly.

The specific gravity of the material forming the elastic ring 15 may be smaller than 1.45. If this is the case, the axial dimension of the elastic ring 15 must be greater than 1.25 times as large as the axial dimension of the thin section 14*b*. More specifically, if the specific gravity of the material forming the elastic ring 15 is smaller than 1.45, the vibration damping performance of the ring 15 is relatively low. The vibration is thus easily transmitted through the thin section 14*b*. Accordingly, as the specific gravity of the material forming the elastic ring 15 decreases, the axial dimension of the ring 15 must be gradually increased with respect to the axial dimension of the thin section 14*b*.

The shape of the rotor 12 may be modified as needed. For example, the rotor 12 may include a plurality of thin radial sections 14*b*. Alternatively, the thin section 14*b* may be eliminated from the rotor 12. Further, the resin collar 13 and the main body 14 may be formed as one body.

In the motor 1 of FIG. 1, the flat sides 5*a* are formed on the rotary shaft 5 to stop the rotor 12 from rotating relative to the rotary shaft 5. However, the rotary shaft 5 may have any cross-sectional shape, as long as the rotor 12 does not rotate relative to the rotary shaft 5.

Pressing members other than the belleville spring 17 may press the rotor 12 against the stator 8.

Although the motor 1 of FIG. 1 is a progressive wave type ultrasonic motor, the present invention may be applied to a constant wave type ultrasonic motor.

Therefore, the present examples and embodiments are to be considered as illustrative and not restrictive and the invention is not to be limited to the details given herein, but may be modified within the scope and equivalence of the appended claims.

What is claimed is:

1. An ultrasonic motor comprising:
   a stator, which includes a piezoelectric element;
   a rotor, which is opposed to the stator, wherein the rotor includes an annular contact portion that contacts the stator and a thin section, which is located radially inward with respect to the contact portion, the thin section being thinner in the axial direction than the remainder of the rotor, wherein the piezoelectric element vibrates the stator to rotate the rotor; and
   an elastic member secured to the thin section, wherein the mass of the elastic member is within a predetermined range of masses, and the motor speed at which a predetermined level of noise is produced by the motor is substantially constant for the masses in the predetermined range.

2. The ultrasonic motor as set forth in claim 1, wherein the mass of the elastic member is approximately the minimum value in the predetermined range.

3. The ultrasonic motor as set forth in claim 1, wherein frequency of the noise is substantially 5 kHz or higher.

4. The ultrasonic motor as set forth in claim 1, wherein the thickness, as measured in the axial direction, of the elastic member is 1.25 or more times as large as the thickness, as measured in the axial direction, of the thin section.

5. The ultrasonic motor as set forth in claim 1, wherein the rotor has a recess formed at a position corresponding to the thin section, and the elastic member is received in the recess.

6. The ultrasonic motor as set forth in claim 1, wherein the thin section has a first side facing the stator and a second side opposite to the first side, and the elastic member is secured to at least one of the first and second sides.

7. The ultrasonic motor as set forth in claim 1, wherein the elastic member has an annular shape.

8. The ultrasonic motor as set forth in claim 7, wherein a cross-sectional shape of the elastic member is substantially uniform along the entire circumference.

9. The ultrasonic motor as set forth in claim 1, wherein the elastic member is formed of a resin material.

10. The ultrasonic motor as set forth in claim 1, wherein the elastic member is formed of silicone rubber.

11. The ultrasonic motor as set forth in claim 1, wherein the elastic member has a loss factor equal to or greater than 0.075.

12. The ultrasonic motor as set forth in claim 1, wherein a specific gravity of the elastic member is equal to or smaller than 1.45.

13. An ultrasonic motor comprising:
    a stator, which includes a piezoelectric element;
    a rotor, which is opposed to the stator, wherein the rotor includes an annular contact portion that contacts the stator and an annular thin section, which is located radially inward with respect to the contact portion, the thin section being thinner in the axial direction than the remainder of the rotor, wherein the piezoelectric element vibrates the stator to rotate the rotor; and an annular elastic member, which is secured to the thin section, the specific gravity of the elastic member being equal to or smaller than 1.45, and the thickness of the elastic member in the axial direction being 1.25 or more times as large as the thickness, as measured in the axial direction, of the thin section.

14. The ultrasonic motor as set forth in claim 13, wherein the elastic member has a loss factor equal to or greater than 0.075.

15. The ultrasonic motor as set forth in claim 13, wherein the axial thickness of the elastic member is greater with respect to the axial thickness of the thin section as the specific gravity of the elastic member decreases.

16. The ultrasonic motor as set forth in claim 13, wherein the mass of the elastic member is within a predetermined range of masses, and the motor speed at which a predetermined level of noise is produced by the motor is substantially constant for the masses in the predetermined range.

17. The ultrasonic motor as set forth in claim 13, wherein the rotor has a recess formed at a position corresponding to the thin section, and the elastic member is received in the recess.

18. The ultrasonic motor as set forth in claim 13, wherein the thin section has a first side facing the stator and a second side opposite to the first side, and the elastic member is secured to at least one of the first and second sides.

19. The ultrasonic motor as set forth in claim 13, wherein a cross-sectional shape of the elastic member is substantially uniform along the entire circumference.

20. The ultrasonic motor as set forth in claim 13, wherein the elastic member is formed of a resin material.

21. The ultrasonic motor as set forth in claim 13, wherein the elastic member is formed of silicone rubber.

* * * * *